United States Patent Office 3,286,073
Patented Nov. 15, 1966

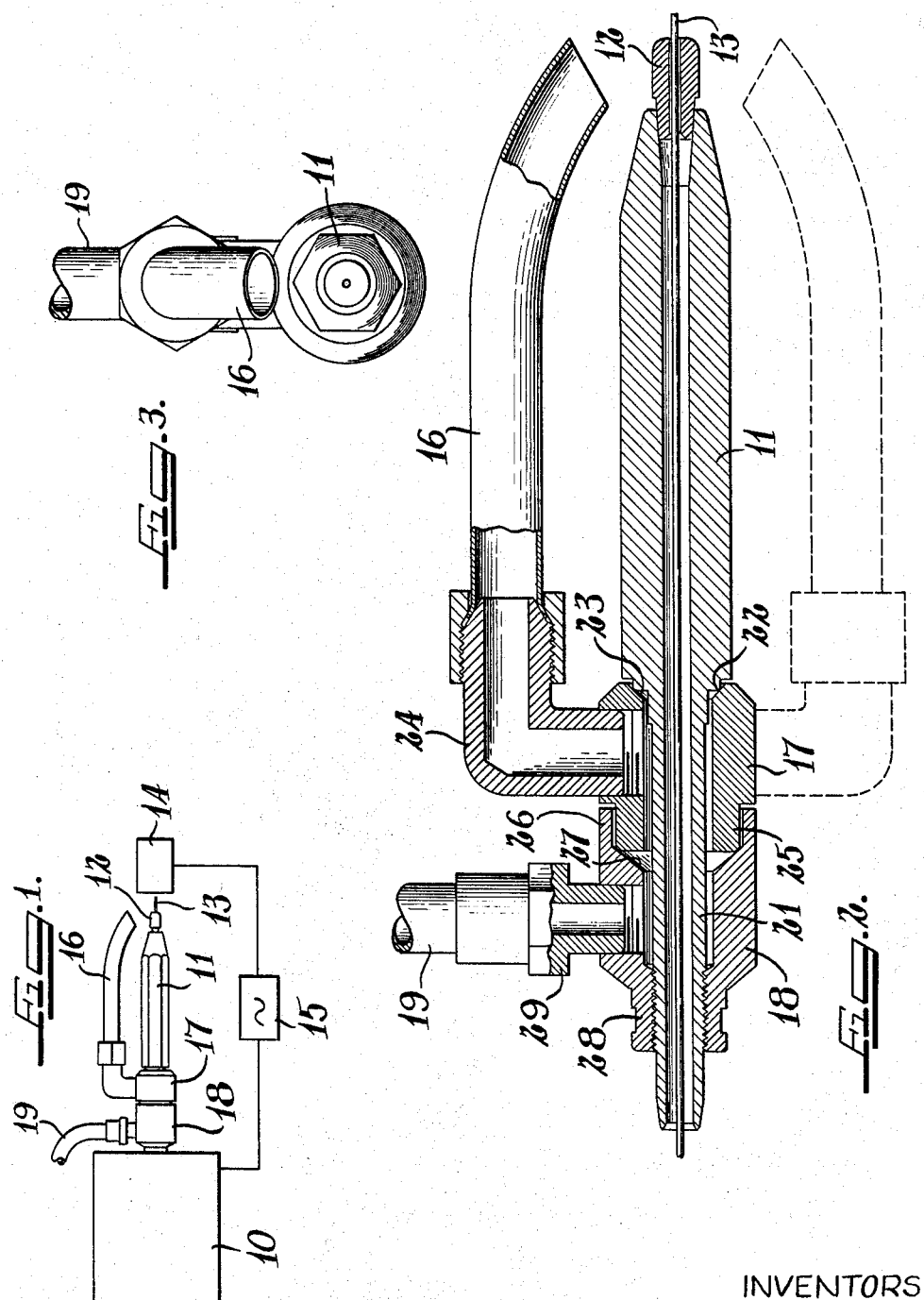

3,286,073
WELDING APPARATUS
George Kofron and Edward A. Benfield, Chicago, Ill., assignors to Acme Welding Supply Co., a corporation of Illinois
Filed Mar. 22, 1965, Ser. No. 441,757
4 Claims. (Cl. 219—130)

This invention relates to welding apparatus and more particularly to a welding tip structure in which a stream of inert or shielding gas is directed over the welding tip during a welding operation.

Welding apparatus has been known heretofore in which a gas conduit is carried by the welding tube or tip to direct a stream of shielding gas over the area being welded. In such apparatus commonly a conduit is carried by a collar rotatably mounted on the welding tube or tip and held in adjusted position thereon by set screws or the like. This tip structure makes it difficult to adjust the angle of the conduit around the tube or tip due to the necessity of loosening or tightening set screws in awkward and sometimes confined spaces. It nevertheless becomes necessary at relatively frequent intervals to adjust the position of the conduit to clear different types of work pieces particularly in machine welding operations.

It is accordingly an object of the present invention to provide a welding apparatus in which the angular position of a gas conduit can easily and quickly be adjusted around the welding tube or tip without the necessity of handling small set screws or similar fastenings.

Another object is to provide welding apparatus in which adjustment of the conduit around the welding tube is accomplished by turning the welding tube itself to loosen and then tighten a conduit supporting collar thereon.

According to a feature of the invention the conduit supporting collar fits rotatably on the welding tube and is clamped between a shoulder on the tube and a second collar into which the tube is threaded. Preferably the first collar seals against the shoulder on the tube and against the second collar by means of interfitting conically tapered surfaces and circular surfaces which provide an effective fluid seal and which also tend to wedge together to secure the first collar in adjusted position against rotation.

Another advantageous feature of the invention is that all of the parts with the exception of the conduit are concentric with the tube and are of minimum diameter to occupy a minimum amount of space and create minimum interference with the welding operation.

The above and other objects and features of the invention will be more readily apparent from the following description when read in connection with the accompanying drawing in which:

FIG. 1 is a reduced diagrammatic view of a machine welding apparatus equipped with a welding tube embodying the invention;

FIG. 2 is a section through the welding tube of the invention with parts in elevation; and FIG. 3 is an end view of the welding tube looking from the right in FIG. 2.

As diagrammatically illustrated in FIG. 1 a complete welding apparatus embodying the invention may comprise a welding head indicated at 10 to which a welding tube 11 is attached. The welding tube terminates in a reduced tip 12 through which a welding wire shown at 13 passes to effect a weld with a work piece indicated at 14. The work piece and welding head are connected to opposite sides of a welding current supply mechanism indicated at 15 so that an arc will be drawn between the welding wire 13 and the work to effect a welding operation.

The welding area is shielded by a shielding gas supplied through a conduit 16 carried by the welding tube 11 and terminating in a discharge orifice directed toward the welding tip to direct a stream of shielding gas across the tip and over the welding area. The conduit 16 is carried by a first collar 17 which is rotatably mounted on the welding tube and which is clamped between a shoulder on the welding tube and a second collar 18 mounted thereon. The collars fit loosely around the tube and communicate with each other and with the conduit 16 so that gas can flow from an inlet conduit 19 into the second collar 18, from this collar into the collar 17 and finally through the conduit 16 to flow over the welding area.

The construction of the parts is better shown in FIGS. 2 and 3 from which it is apparent that the exterior of the tube 11 is of a non-circular shape, being shown as hexagonal, so that a wrench may be applied thereto for turning it. The wire 13 passes through the tube 11 and through the welding tip 12 carried thereby to project beyond the welding tip as shown. At one end the tube 11 is of reduced circular section as shown at 21 and this reduced section portion is joined to the major portion of the tube by a circular shoulder 22 whose diameter is equal to the distance across the flats of the welding tube. As shown in FIG. 2 the shoulder 22 projects outwardly beyond the maximum diameter portions of the welding tube so that it can cleanly engage the collar 17 as described more fully hereinafter.

The collar 17 terminates at its right end as seen in FIG. 2 in an internal conically flared surface 23 which seats against and engages the circular surface 22. The collar is of larger internal diameter than the reduced diameter portion 21 of the tube so that gas can flow through the collar and also so that the collar can float to center itself with respect to the circular portion 22 of the tube. With this construction it has been found that a metal-to-metal engagement between the shoulder 22 and the conical surface 23 will provide an effective gas tight seal and will produce a wedging action tending to secure the collar on the tube against movement. The conduit 16 is carried by an angle fitting 24 threaded into the collar and projecting therefrom as shown.

At its opposite end the collar terminates in a reduced circular section portion 25 terminating in a circular shoulder similar to the shoulder 22. Preferably both of these shoulders are slightly rounded for better seating. The reduced portion 25 extends loosely into a skirt portion 26 on the second collar 18 and seats against an internal conical surface 27 in the second collar 18 to provide an effective fluid tight seal and to center the collars relative to each other.

The second collar 18 adjacent to the conical surface 27 is of larger internal diameter than the external diameter of the tube portion 21 to provide a passage for flow of gas therethrough and into the first collar. At its left end as seen in FIG. 2 the second collar terminates in a reduced portion 28 which is internally threaded to thread on to an externally threaded portion of the tube. The conduit 19 may connect to a fitting 29 extending outwardly from the second collar 18 and communicating with the interior thereof.

In use of the apparatus the welding tube 11 is mounted in a welding head such as indicated diagrammatically at 10 at its left end and is normally rotatably relative to the welding head. When the conduit 16 has been turned to the desired angular position around the welding tube it can be secured in that position simply by turning the welding tube through a wrench or the like relative to the collar 18 which is normally held against rotation by the conduit 19. This will draw the wedging surface 23 up against the shoulder 22 and will simultaneously draw the wedging surface 27 up against the shoulder 25 to seal the collars against gas leakage and to secure the first collar in the desired angular position. When it is desired to change the position of the conduit 16 a wrench may again be applied to the tube 11 to turn it in a direction to release the gripping of the first collar which may then be turned freely to the desired new position. Once in the desired new position the tube 11 can again be turned in the opposite direction to grip the collar 17 between the shoulder 22 on the tube and the second collar 18 and the apparatus is again ready for use.

It will be seen that angular adjustment of the gas conduit can be effected easily without the necessity of working in confined spaces or with small set screws or the like. Furthermore, a very compact assembly is provided which will create minimum interference with welding operations.

While one embodiment of the invention has been shown and described in detail it will be understood that this is illustrative only and is not to be taken as a definition of the scope of the invention, reference being had for this purpose to the appended claims.

What is claimed is:

1. Welding apparatus comprising an elongated tube adapted for passage of a welding wire therethrough and terminating at one end in a welding tip, said tube having an external annular shoulder thereon intermediate its ends and an externally threaded portion spaced from the shoulder, a first collar fitting loosely and rotatably around the tube and engaging the shoulder at one end, a second collar threaded onto the threaded portion of the tube and engaging the other end of the first collar, a conduit carried by the first collar and terminating adjacent to the welding tip to direct a stream of gas thereon, and means defining a connection for gas under pressure to the interior of the first collar to flow therethrough and through said conduit, the second collar being movable into tight engagement with the first collar to force the first collar against the shoulder and hold it against rotation.

2. Welding apparatus comprising an elongated tube adapted for passage of a welding wire therethrough and terminating at one end in a welding tip, said tube having an external annular shoulder thereon intermediate its ends and an externally threaded portion spaced from the shoulder, a first collar fitting loosely and rotatably around the tube and engaging the shoulder at one end, a second collar threaded on the threaded portion of the tube spaced from the other end of the first collar and being of larger diameter than the tube adjacent to the first collar and fitting against the other end of the first collar, a conduit carried by and communicating with the interior of the first collar and terminating adjacent to the welding tip to direct a stream of gas thereover, and a gas supply connection to the interior of the second collar to supply gas under pressure thereto.

3. The welding apparatus of claim 1 in which one end of the first collar is concavely conical and accommodates the shoulder on said tube, and the other end of the first collar and the adjacent end of the second collar engage through an external annular circular shoulder on one fitting sealingly into a concavely conical recess in the other.

4. The welding apparatus of claim 2 in which one end of the first collar is concavely conical and accommodates the shoulder on said tube, and the other end of said first collar is of circular section and fits sealingly and wedgingly into a concavely conical end of said second collar.

References Cited by the Examiner
UNITED STATES PATENTS 2,966,577 12/1960 Welch _____ 219—130
3,172,992 3/1965 Keller _____ 219—130

RICHARD M. WOOD, *Primary Examiner.*